(12) United States Patent
Winzinger

(10) Patent No.: US 10,456,954 B2
(45) Date of Patent: Oct. 29, 2019

(54) METHOD AND APPARATUS FOR SHAPING PLASTICS MATERIAL PRE-FORMS INTO PLASTICS MATERIAL CONTAINERS

(71) Applicant: KRONES AG, Neutraubling (DE)

(72) Inventor: Frank Winzinger, Regensburg (DE)

(73) Assignee: KRONES AG, Neutraubling (DE)

( * ) Notice: Subject to any disclaimer, the term of this patent is extended or adjusted under 35 U.S.C. 154(b) by 620 days.

(21) Appl. No.: 14/314,529

(22) Filed: Jun. 25, 2014

(65) Prior Publication Data

US 2015/0001747 A1     Jan. 1, 2015

(30) Foreign Application Priority Data

Jun. 26, 2013   (DE) .................. 10 2013 106 694

(51) Int. Cl.
*B29C 33/72* (2006.01)
*B29C 49/12* (2006.01)
(Continued)

(52) U.S. Cl.
CPC .............. *B29C 33/72* (2013.01); *B29C 49/46* (2013.01); *B29C 49/06* (2013.01); *B29C 49/12* (2013.01);
(Continued)

(58) Field of Classification Search
CPC ......... B29C 33/72; B29C 49/46; B29C 49/06; B29C 49/36; B29C 49/52; B29C 2049/4694; B29C 49/12; B29C 2033/727; B29C 2049/5803; B29C 49/42; B29C 49/4252; B29C 2049/1228; B29C 2049/4679; B29C 2049/4892;
(Continued)

(56) References Cited

U.S. PATENT DOCUMENTS 6,984,360 B1 * 1/2006 Feuilloley ............... A61L 2/208
                                                        141/6
8,435,024 B2 * 5/2013 Dordoni .................. B29C 49/12
                                                       264/525
(Continued)

FOREIGN PATENT DOCUMENTS

DE   10 2008 032635   1/2010
DE   102008032635    1/2010
(Continued)

OTHER PUBLICATIONS

Extended European Search Report from Corresponding European Application No. 14174602.4, dated Nov. 4, 2014.

*Primary Examiner* — Seyed Masoud Malekzadeh

(74) *Attorney, Agent, or Firm* — Greer, Burns & Crain, Ltd.

(57) ABSTRACT

A method of shaping plastics material pre-forms into plastics material containers is provided, in which the plastics material pre-forms are expanded inside a blow mold with the aid of an expansion agent and a stretch rod to form the plastics material containers, and in which at least the blow mold and/or the stretch rod is or are sterilized if necessary at least in part with sterilization agent, wherein, to sterilize the outer side of the stretch rod, the stretch rod is displaced at least in part into the blow mold, and the sterilization agents are brought from a discharge element arranged outside the stretch rod to the exterior face of the stretch rod.

12 Claims, 6 Drawing Sheets

(51) Int. Cl.
*B29C 49/46* (2006.01)
*B29C 49/42* (2006.01)
*B29C 49/06* (2006.01)
*B29C 49/36* (2006.01)
*B29C 49/52* (2006.01)
*B29C 49/58* (2006.01)

(52) U.S. Cl.
CPC .......... *B29C 49/36* (2013.01); *B29C 49/4252* (2013.01); *B29C 49/52* (2013.01); *B29C 2033/727* (2013.01); *B29C 2049/4694* (2013.01); *B29C 2049/5803* (2013.01)

(58) Field of Classification Search
CPC .... B29C 2049/1204; B29C 2049/1209; B29C 2049/1214; B29C 2049/1219; B29C 249/1223; B29C 49/28; B29C 49/30; B29C 49/32; B29C 2049/283; B29C 2049/286
USPC ....... 425/227, 228, 229, 230, 231, 528, 529; 264/39
See application file for complete search history.

(56) References Cited

U.S. PATENT DOCUMENTS

| | | | |
|---|---|---|---|
| 8,535,037 B2* | 9/2013 | Voth | B29C 49/42 425/225 |
| 8,580,166 B2 | 11/2013 | Hirdina | |
| 8,696,956 B2 | 4/2014 | Winzinger et al. | |
| 8,708,680 B2 | 4/2014 | Geltinger et al. | |
| 8,985,991 B2* | 3/2015 | Winzinger | B08B 9/00 425/225 |
| 2011/0037187 A1* | 2/2011 | Winzinger | B08B 9/00 264/39 |
| 2011/0037188 A1 | 2/2011 | Hirdnia | |
| 2011/0061690 A1 | 3/2011 | Seger | |
| 2011/0285063 A1* | 11/2011 | Chauvin | B29C 49/46 264/525 |
| 2011/0287126 A1* | 11/2011 | Geltinger | B29C 49/12 425/522 |
| 2011/0291332 A1* | 12/2011 | Voth | B29B 13/024 264/532 |
| 2011/0311675 A1* | 12/2011 | Voth | B29C 49/42 425/526 |
| 2012/0010750 A1* | 1/2012 | Wahl | A61L 2/28 700/266 |
| 2012/0070522 A1* | 3/2012 | Voth | B65B 55/08 425/88 |
| 2012/0164258 A1* | 6/2012 | Dordoni | B29C 49/12 425/225 |
| 2012/0326358 A1 | 12/2012 | Geltinger et al. | |
| 2012/0326359 A1 | 12/2012 | Neubauer et al. | |
| 2013/0193601 A1* | 8/2013 | Wilson | B29C 49/4273 264/39 |
| 2014/0196415 A1 | 7/2014 | Drenguis et al. | |
| 2016/0200028 A1* | 7/2016 | Lewin | B29C 49/12 264/446 |

FOREIGN PATENT DOCUMENTS

| | | | | |
|---|---|---|---|---|
| DE | 102011008132 | | 7/2012 | |
| EP | 2 255 949 | * | 12/2010 | ............ B29C 49/42 |
| WO | 2011030183 | | 3/2011 | |
| WO | WO 2011030183 A1 | * | 3/2011 | ............ B29C 49/12 |
| WO | 2012/092921 | | 7/2012 | |
| WO | 2012/156013 | | 11/2012 | |
| WO | 2013093634 | | 6/2013 | |

* cited by examiner

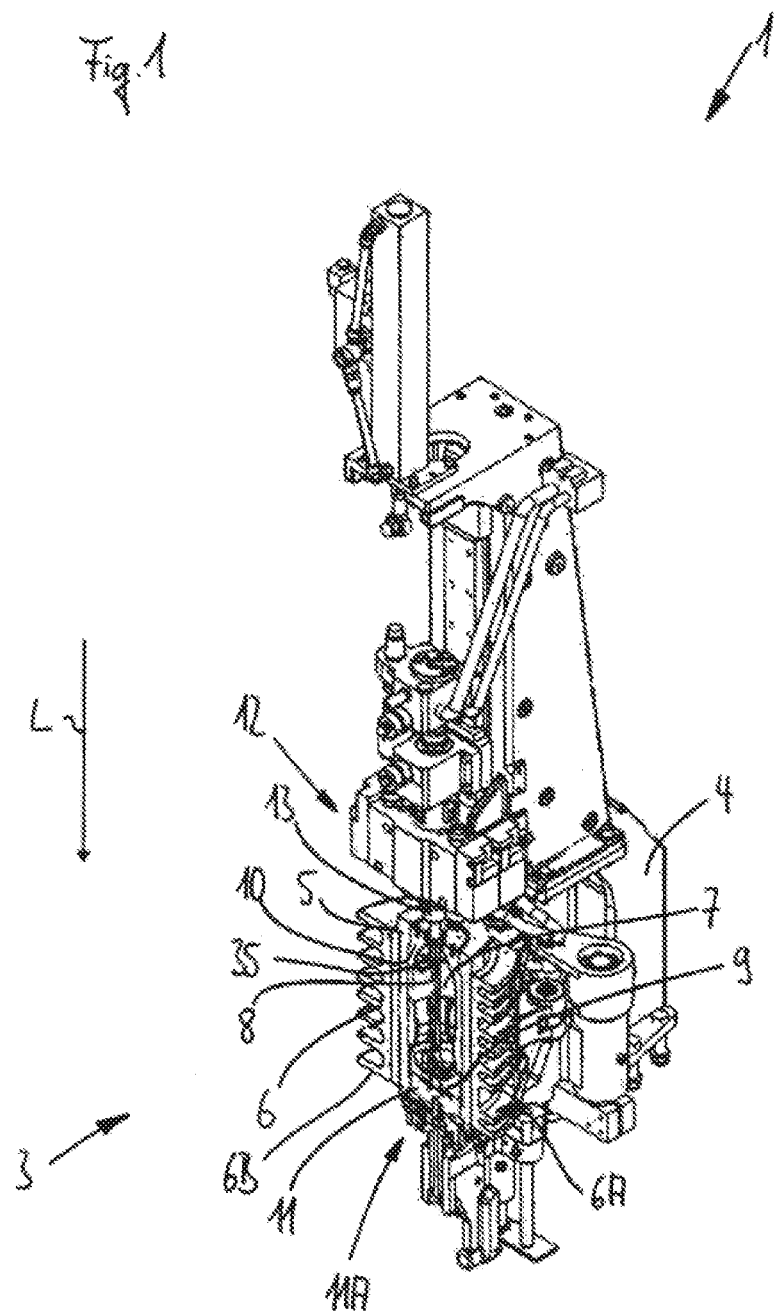

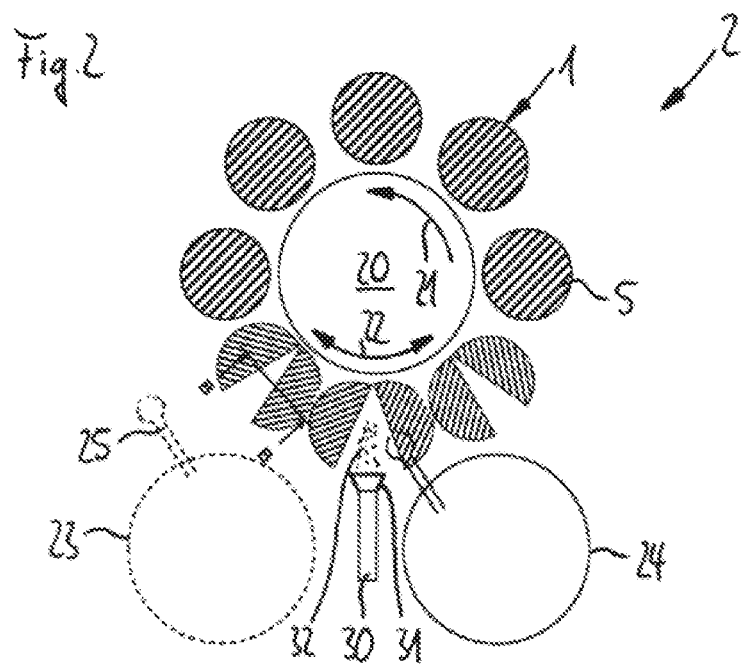
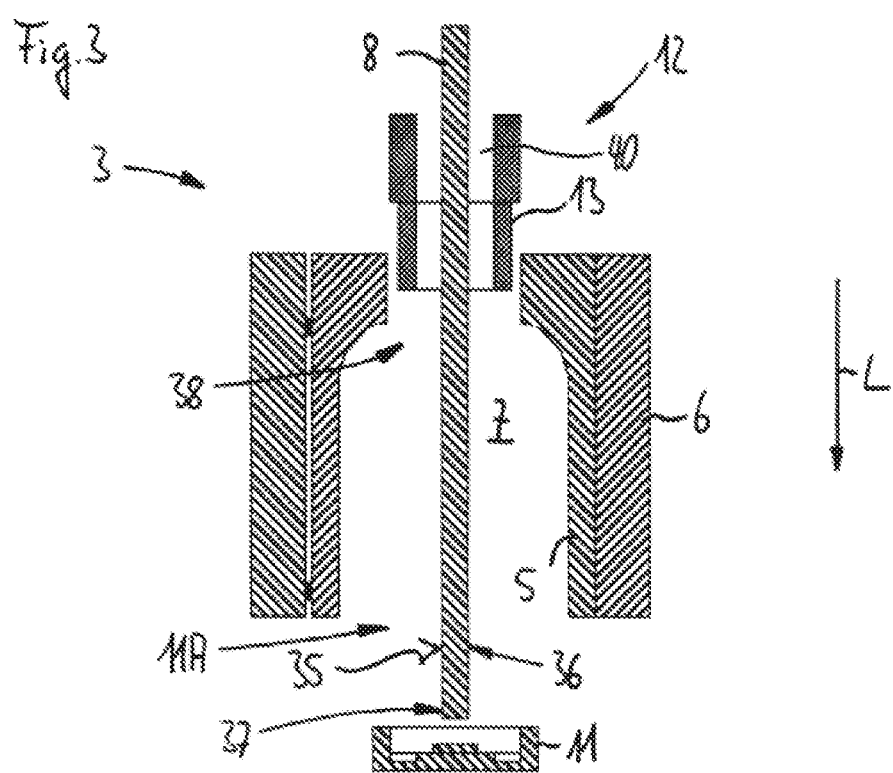

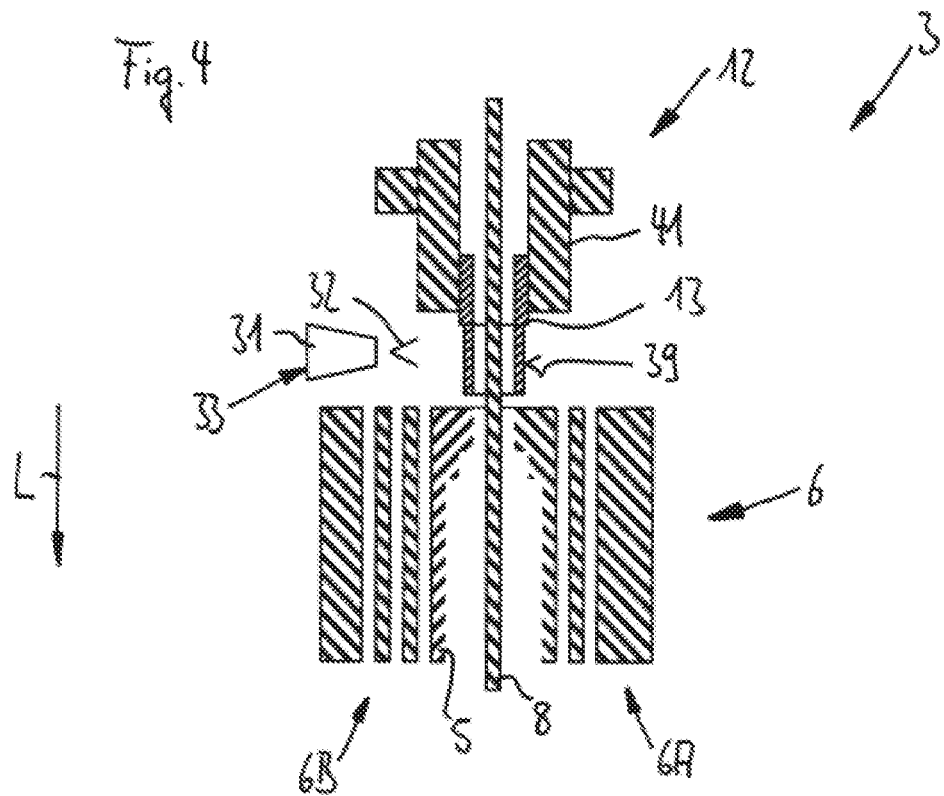
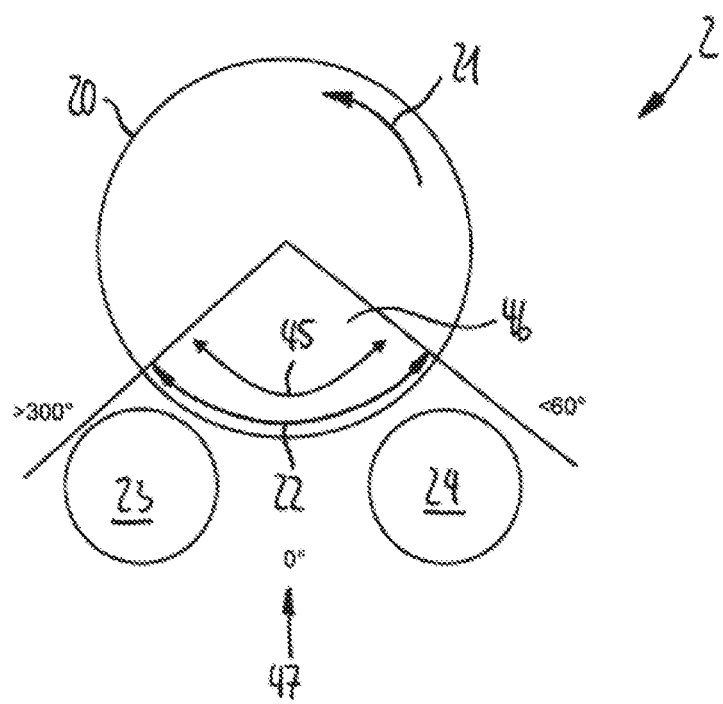

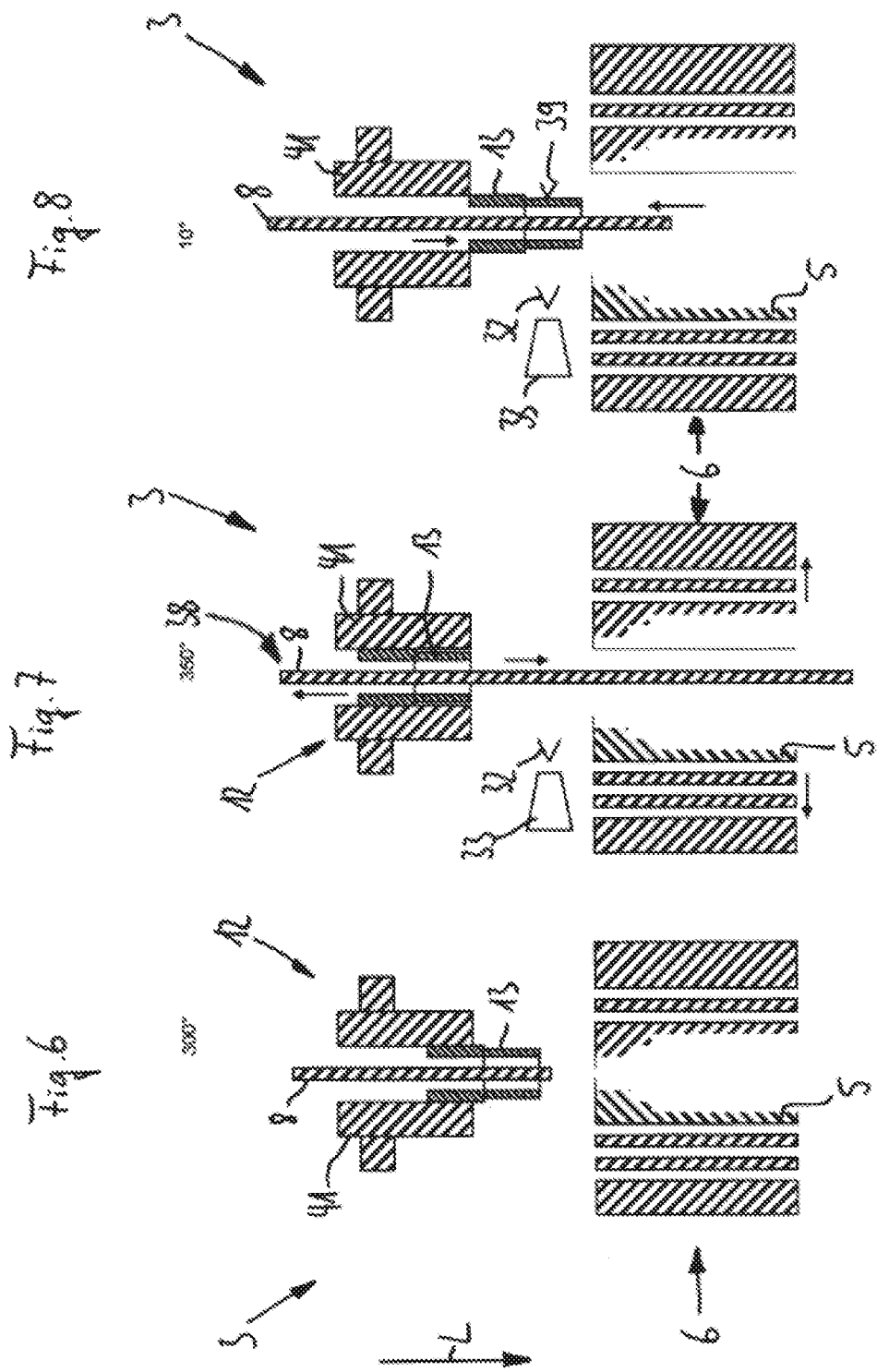

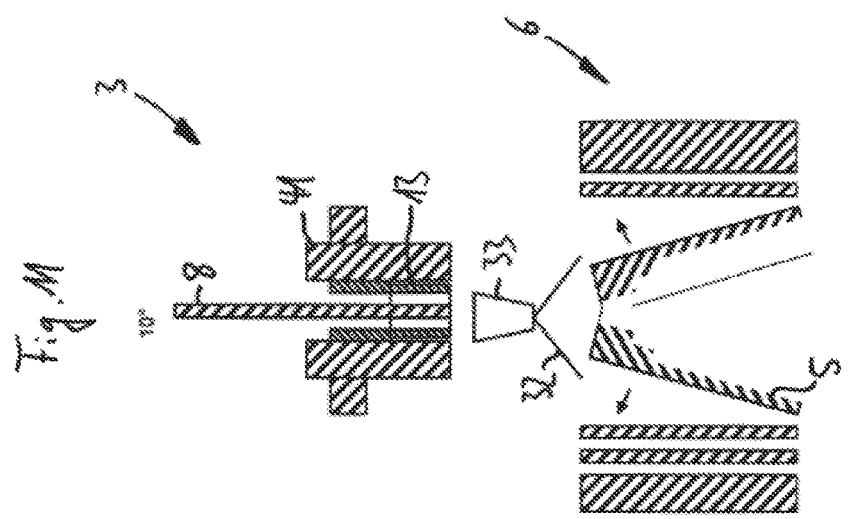
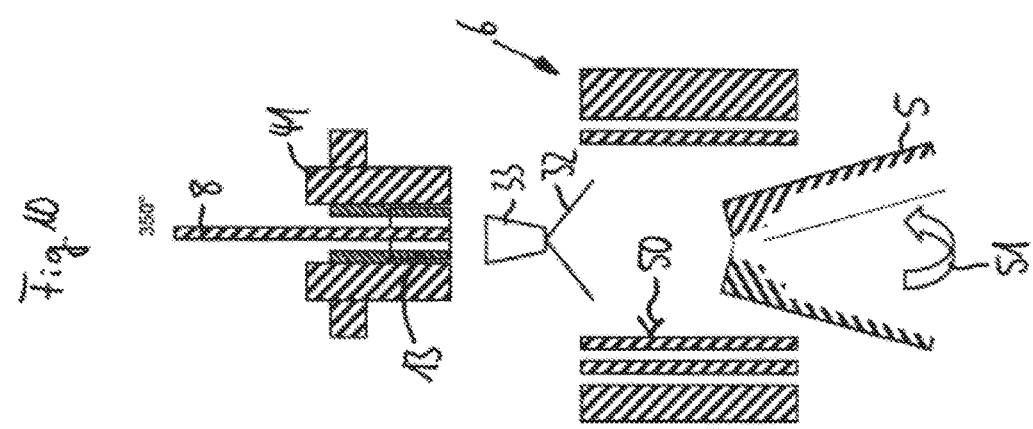
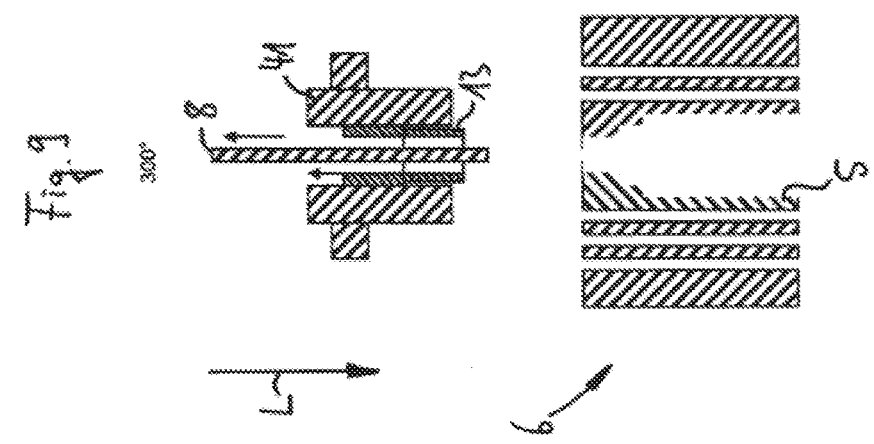

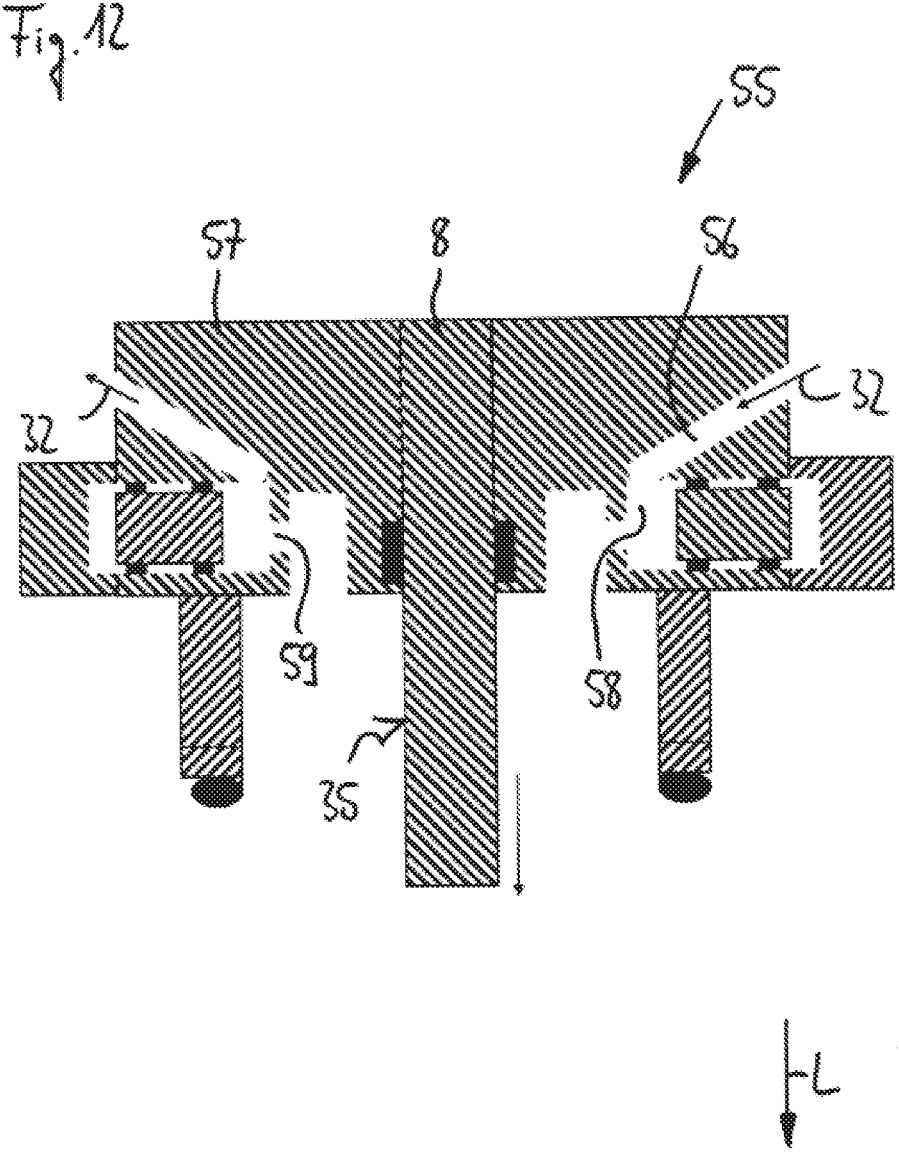

METHOD AND APPARATUS FOR SHAPING PLASTICS MATERIAL PRE-FORMS INTO PLASTICS MATERIAL CONTAINERS

BACKGROUND

The invention relates to a method of shaping plastics material pre-forms into plastics material containers, in which the plastics material pre-forms are expanded inside a blow mould with the aid of an expansion agent and a stretch rod to form the plastics material containers and in which at least the blow mould and/or the stretch rod is or are sterilized if necessary at least in part with sterilization agent.

The invention further relates to an apparatus for shaping plastics material pre-forms into plastics material containers, with at least one blow moulding device comprising a blow mould and a stretch rod, and with a sterilization device and/or cleaning device, by means of which the blow moulding device is capable of being sterilized and/or cleaned at least in part.

In the following, in order to simplify the language in part only the term "sterilization" will be used instead of "sterilization and/or cleaning". It is pointed out, however, that this term should likewise relate to a cleaning or at least a disinfection in part. This also applies in a corresponding manner to terms which contain the component "sterilization" such as for example "sterilization agent" or "sterilization device".

Generic methods and apparatus for shaping plastics material pre-forms into plastics material containers are well known from the prior art. As well as the actual blow moulding procedure, in particular a proper sterilization of the components of a blow moulding device on a blow moulding station is also crucially important since during the production of the plastics material containers these components frequently come into contact themselves, even if only locally, with these plastics material pre-forms and/or plastics material containers. In particular, in the case of foodstuffs, such as for example fruit juices and so forth, which are susceptible to germs, spores or the like, sterile tools are crucially important and for this reason individual process steps are also frequently carried out under aseptic conditions in a clean room.

A plurality of different devices, different methods and process variants have already been developed for sterilization purposes, in order to treat not only the plastics material pre-forms and the plastics material containers but, in addition, also individual components of the respective blow moulding device with suitable sterilization agents, such as for example ozone ($O_3$), heat (hot air), hydrogen peroxide ($H_2O_2$), peracetic acid, other chemicals or with charge carriers produced by an electron source, in particular electrons (optionally also, on the other hand, protons or alpha particles). This should ensure as extensively as possible that, in particular, the plastics material containers produced are not contaminated to a critical degree by germs or the like when they are filled with susceptible foodstuffs. It would also be possible for other radiation such as UV, gamma or x-ray radiation to be used for the sterilization. In particular, gaseous hydrogen peroxide has been found to be particularly advantageous. If it is only intended for a cleaning to be carried out, then this could be performed with a cleaning foam.

SUMMARY

The object of the invention is further to develop generic methods and apparatus in such a way that sterilization procedures of components of a blow moulding device of an apparatus for shaping plastics material pre-forms into plastics material containers can be carried out more effectively.

The invention is based upon the generic prior art in that, in order to sterilize the outer side of the stretch rod, the latter is displaced at least locally or in part into the blow mould, and the sterilization agents are brought from a discharge element arranged outside the stretch rod and/or a blow moulding nozzle to at least part of the exterior face of the stretch rod, in particular while the stretch rod (8) is situated in the blow mould (5).

On account of the fact that the sterilization agents are radiated or applied from outside the stretch rod onto part of the exterior face or onto the entire exterior face of the stretch rod, whilst the latter is displaced into the blow mould and/or out of the blow mould and, in particular, is positioned temporarily between two halves of the blow mould, a sterilization of the stretch rod which is particularly effective in particular between individual blow moulding procedures is possible, without a large amount of structurally complicated changes having to be carried out.

As a result, it is made possible for the time interval between successive expansion procedures of two plastics material pre-forms not to be lengthened unnecessarily on account of the sterilization of the stretch rod, so that the plastics material pre-forms can be blow moulded in a customarily rapid manner in succession to form the plastics material containers, ideally without a delay caused by a sterilization procedure.

A sterilization can be carried out during the production process on the one hand and/or also during a separate sterilization mode in which no containers are produced and which is carried out at specified intervals before a production cycle on the other hand. This is dependent upon the respective conditions under which the containers are produced. If for example the stretch rod is present completely and continuously in a clean room, then it is not absolutely necessary for a sterilization of the stretch rod to be carried out after every blow moulded bottle or in a continuous manner. If the stretch rod is not present in the clean room or if the machine has no clean room at all, then a contamination of the stretch rod is more probable. For this reason, it is advantageous in this case for a sterilization to be carried out more frequently. In the same way, the frequency of a sterilization is dependent upon the product to be filled.

In the case of a further advantageous method, a region of the exterior face of the stretch rod is cleaned and/or sterilized which is continuously covered by the blow moulding nozzle in a normal production operation, namely in particular by moving the blow moulding nozzle up and/or by moving the stretch rod down further than in the production mode (i.e. in comparison with a setting of the stretch rod in the production mode).

By way of example, with a suitable design of the blow moulding device the sterilization agents can be brought by way of one or more blow moulding channels of the blow moulding nozzle from the outside to part of the exterior face or the entire exterior face of the stretch rod. This could also be carried out with the blow mould closed but empty, if the stretch rod is displaced into the blow mould and/or out of the blow mould in an unscheduled manner, i.e. not for the axial stretching of a plastics material pre-form.

By way of example, the stretch rod is driven in this case by an electric motor, in particular a linear motor, in which case it can then be sprayed, gassed or treated respectively with sterilization agents while moving down and/or moving up and/or pausing in the lower position. It is possible for the stretch rod also to be capable of being moved in a corresponding manner by other drive means, for example pneumatically or hydraulically or by the use of a guide cam. For this purpose the guide cam could be designed so as to be movable or the stretch rod is decoupled from the fixed guide cam.

In particular, during the sterilization the stretch rod is moved out by a stroke which is greater than the stroke which is covered during the production process. In this way, it is also possible to sterilize the part of the stretch rod which is normally situated above (in a direction facing away from the blow mould) a seal or the blow moulding nozzle surrounding the stretch rod coaxially. This is possible, in particular, in the situation where a pre-form is not present in the blow mould, since the stretch rod can then be moved as far as the base of the blow mould, i.e. by the thickness of the material of the pre-form (in the case of pre-forms with an injection point on the base the value amounts to more than 2 millimeters).

In particular, the part of the exterior face of the stretch rod which is contacted by sterilization agent is greater than the part which in the normal production process is present to the maximum degree below a blow moulding air seal or the surrounding blow moulding nozzle.

What is decisive, however, is not only the blow moulding air seal but also whether the part of the stretch rod is covered by the blow moulding nozzle or material in a valve block. In particular, at the moment of cleaning or sterilization of the stretch rod the blow moulding nozzle is in an upper position or respectively a position facing away from the blow mould with respect to it.

The part of the stretch rod in question is, as it were, in particular freely accessible radially.

If the base of the blow mould is additionally moved down in a region (usually in a discharge region for the containers, for example between the run-out star wheel and the run-in star wheel as viewed in the direction of rotation of the blow moulding wheel), then the stretch rod can be additionally moved down in this region by a further distance (at most by the maximum stroke of the base movement of the blow mould). In this way, a major part of the external surface of the stretch rod is once again "made free" for sterilization. This region is usually situated in a valve block and is rarely accessible.

If the base is likewise not controlled in a fixed manner by cams, it would also be possible for the base to be moved down, for example by means of an electric motor, "in a non-scheduled manner" during a sterilization cycle, in order to arrive with the sterilization agent at the regions of the stretch rod which can be reached only with difficulty.

In the sense of the invention the expression "if required" means that in particular the stretch rod and/or the blow moulding nozzle of the blow moulding device is or are sterilized between individual expansion processes. It is preferable for the plastics material pre-forms to move at least for a time during the expansion thereof and, in a particularly preferred manner, they move along a circular path at least locally.

Ideally, neither a plastics material pre-form nor a plastics material container produced from the latter is present inside the blow mould in this case. This means that the blow mould is empty. In this way, as well as the stretch rod the blow mould can also be sterilized at least locally.

In the sense of the present invention the terminology "exterior face" describes the complete external face of the stretch rod or even the blow moulding nozzle respectively, if they are likewise to be sterilized in the case of a variant of the method.

It is possible for example for ozone ($O_3$), hydrogen peroxide ($H_2O_2$), gaseous or liquid, other chemicals, steam or charge carriers produced by an electron source or UV light, heat, gamma radiation of the like to be used as the sterilization agents.

In particular, the means for the application or irradiation respectively, vaporization or gassing can be situated on the rotating part of the machine. Liquid or gaseous sterilization agents could be conveyed from the stationary part into the machine by way of a rotary distributor. In particular, it is possible in this case for use to be made of the same lines and paths, like the blow moulding air. An example of this is the sterilization of the stretch rod by the blow moulding nozzle.

Alternatively or in addition, the means for the application or irradiation respectively, vaporization or gassing can also be situated on the stationary part.

The object of the invention is likewise attained by an apparatus for the shaping of plastics material pre-forms into plastics material containers, in brief a shaping apparatus.

The invention is based further upon the generic prior art in that at least one sterilization device is arranged with respect to a blow mould in such a way that the stretch rod can be treated with sterilization agent from outside the stretch rod when the stretch rod is displaced into the blow mould.

By means of a shaping apparatus of this type at least part of the exterior face of the stretch rod can be treated particularly expediently with sterilization agents when the stretch rod is displaced or moved respectively into the blow mould and/or out of the blow mould in an unscheduled manner, i.e. not for the purpose of an axial expansion of a plastics material pre-form.

In this respect the method according to the invention can also, in particular, be carried out in an advantageous manner by means of the present shaping apparatus.

In all events very many regions of components present on a blow moulding device can be sterilized by means of the shaping apparatus and, in particular, also by means of the method according to the invention.

The method according to the invention can advantageously be further developed if a blow moulding nozzle is displaced at least in part into the blow mould in order to sterilize this blow moulding nozzle in order to introduce the expansion medium into the blow mould.

As a result it becomes possible for the blow moulding nozzle also to be advantageously treated on its exterior face with sterilization agents in a cumulative or alternative manner, as a result of which it is possible to ensure antiseptic conditions in a substantially more comprehensive and reliable manner on the blow moulding device.

In the case of a suitably designed blow moulding device, for a sterilization of this type it may frequently be sufficient for the blow moulding nozzle to be displaced only to above the blow mould.

The sterilization procedure can be integrated into a blow moulding cycle on a blow moulding station in a particularly inconspicuous manner if the sterilization agents are brought from the outside to the exterior face of the stretch rod and/or to the exterior face of a blow moulding nozzle when the blow mould is opened at least in part.

In this context an advantageous variant of the method also provides that the stretch rod and/or a blow moulding nozzle is displaced into the blow mould when the blow mould passes through a rotation path between a run-out region for the discharge of a plastics material container expanded from the plastics material pre-form and a run-in region for the introduction of a plastics material pre-form into the blow mould.

In particular, with respect to an apparatus for the shaping of plastics material pre-forms into plastics material containers with a blow moulding wheel which is provided with a plurality of blow moulding stations which in turn comprise one blow moulding device in each case, the blow mould of the respective blow moulding device is opened in accordance with the process in the region of a rotation path of this type in order to remove a previously blow moulded plastics material container from the opened blow mould in the region of a corresponding run-out star wheel. Before a new plastics material pre-form on a run-in star wheel arranged behind the run-out star wheel in the direction of rotation of the blow moulding wheel is now introduced into this blow mould, in particular the stretch rod and/or the blow moulding nozzle can be introduced into the opened blow mould and can be treated with sterilization agents from the outside.

It is advantageous for the blow moulding wheel to rotate about an axis of rotation which extends vertically, i.e. which is directed towards the centre of the earth. It is advantageous for the apparatus to have a clean room inside which the plastics material pre-forms are shaped into the plastics material containers. This clean room can preferably surround the conveying path of the plastics material containers in the manner of a channel in this case. In addition, sealing devices can also be provided which demarcate the clean room with respect to a (non-sterile) environment. In this case, in particular, use can be made of hydraulic seals, such as for example so-called surge chambers.

In particular, the blow moulding wheel rotates at least for a time during the sterilization process.

An additional introduction of the stretch rod or the blow moulding nozzle respectively into the blow mould in this way is advantageously carried out in a non-scheduled manner in the present case, as against conventional methods.

Opening and closing the blow mould is preferably carried out in this case in a known manner in which the halves of each blow mould are held on carrier elements of a blow mould carrier, in which case these carrier elements are mounted about a common axis of rotation in such a way that they are pivotable towards each other or away from each other about this axis of rotation.

The advantage in this case is that, in order to open the blow mould, use can be made of an opening and closing mechanism which is already present and which comprises for example corresponding cam paths for actuating an opening and closing device, so that even shaping apparatus already in operation can be retrofitted in a structurally simple manner by the present sterilization device and can be converted to the method according to the invention.

It is possible for the present method also to be capable of being carried out by means of shaping apparatus which do not comprise a rotation path of this type produced by a blow moulding wheel, but are of a different design, for example stationary clock time machines.

An alternative variant of the method provides that the stretch rod and/or a blow moulding nozzle is or are displaced into the blow mould when the blow mould passes through a blow mould exchange region in which an exchange of different blow moulds for blow moulding different containers is carried out if required.

As a result, an already existing opening and closing mechanism can also be used for the present method. And in this case the method according to the invention can also be integrated in an existing blow moulding cycle practically without delay.

By way of example, the blow mould exchange region is present in a range of 20° behind a run-in star wheel as viewed in the direction of rotation of the blow moulding wheel and of 20° in front of the run-out star wheel as viewed in the direction of rotation.

If the sterilization agents are moved from outside the blow mould to the exterior face of the stretch rod and/or to the exterior face of a blow moulding nozzle when the blow mould is opened at least in part, a corresponding sterilization device can be installed in a generic shaping apparatus in a structurally simple manner.

In this respect an advantageous variant of embodiment provides that the at least one sterilization device is arranged with respect to the blow mould (or in the region of the blow mould respectively) in such a way that the stretch rod can be treated with sterilization agent from outside the blow mould when the stretch rod is displaced into the blow mould. The same applies with respect to the blow moulding nozzle of the blow moulding device.

The present method can be substantially further developed if the stretch rod and/or a blow moulding nozzle is or are irradiated with sterilization agents during a movement out of the blow moulding head or the blow moulding piston respectively of the sterilization device and/or during a movement into the blow moulding head. As a result, the already existing drive of the stretch rod or the blow moulding nozzle respectively can be used for sterilization purposes.

In the case of a further embodiment the sterilization device and/or cleaning device has or have at least one discharge element for the discharge of the sterilization agents and/or cleaning agents and the discharge device or nozzle respectively of the sterilization device and/or the cleaning device is arranged at the level (i.e. along a longitudinal direction) in the region between a valve block of the blow moulding station and the blow mould.

If the at least one sterilization device has at least one discharge element or a stressing device respectively for discharging the sterilization agents, in which case the at least one discharge element is arranged radially beside the stretch rod displaced into the blow mould, then the sterilization agents can be supplied without difficulty from the outside radially onto the stretch rod or also onto the blow moulding nozzle respectively.

If the at least one discharge element is arranged (in particular in a stationary manner) on the periphery of a blow moulding wheel comprising a plurality of blow moulding devices, the existing shaping apparatus can be designed in a particularly compact manner. In this case it is preferable for the discharge element or the stressing device respectively to be arranged in a stationary manner and for the individual blow moulding stations to move past the latter. It would also be possible, however, for a discharge element or a plurality of discharge elements to be present on the carrier on which the individual blow moulding devices are arranged. In this case it would also be possible for one discharge element to be associated with at least one blow moulding device or one shaping station in each case.

The sterilization agents can be conveyed on the overall length of the stretch rod in a particularly reliable manner as far as the stretch rod or the blow moulding nozzle respectively when the at least one discharge element is arranged so as to be radially and/or axially displaceable with respect to the stretch rod. To this end, the stretch rod is made freely accessible. This is frequently not the case, however, and only partial areas of the stretch rod can be sterilized.

In addition, it is advantageous for the at least one discharge element to comprise a spray nozzle and/or a beam emitter. As a result, different sterilization agents can be used and radiated in a suitable manner onto the surfaces of the surface to be sterilized.

It may also be advantageous for two or more discharge elements to be present distributed at different positions on the periphery of the blow moulding wheel, which sterilize the blow moulds or also the blow mould carriers respectively once in a closed state and once in an open state. In addition, the sterilization agents can be different from one another in the case of at least two discharge elements. In addition, various sterilization agents can be used in succession by a discharge element.

It is to be understood that, in particular, the stretch rod can be displaced in a non-scheduled manner at different times in the sense of the invention, in order to sterilize it in the sense of the present invention. In this way, it is possible for the stretch rod and/or a blow moulding nozzle to be displaced into a region between the two blow mould halves before, during or after an opening—at least in part—of the blow mould.

In particular, if it is necessary for a previously expanded plastics material container first to be removed from the blow mould, it is advantageous for the stretch rod and the blow moulding nozzle respectively to be lowered in succession or simultaneously into the blow mould or between the blow mould halves respectively only after the blow mould has been opened and the plastics material container has been removed.

In addition it is advantageous for the stretch rod to be displaced at least in part beyond the base-part position of a blow mould ready for operation.

It is advantageous for the base part to be additionally lowered to this end, if the blow mould halves have been pivoted sufficiently far out of each other.

As a result, it is possible to ensure that the stretch rod can be displaced substantially further into the blow mould than in the case of a normal stretching procedure, as a result of which it is possible even for regions of the stretch rod, which are usually covered by other components of the blow moulding device to be reached by sterilization agents. As a result, the risk of the spread of germs which are otherwise covered and therefore not destroyed can be further reduced.

Alternatively, an opening or recess respectively, which is capable of being opened, in the base part could also be provided for the passage of the stretch rod through the base part in order to displace the stretch rod beyond the position of the base part. Alternatively, the base part could also be pivoted away horizontally out of the region of the stretch rod.

It should be further mentioned at this point that, as well as the stretch rod and the blow moulding nozzle, with a suitable performance of the method it is also possible for further components of the blow moulding device to be sterilized, such as for example the blow mould itself or the locking elements thereof respectively or clamp elements, the blow mould carrier, the master mould or the like respectively.

In addition, it would be possible to allow the blow moulding wheel to rotate (in particular completely) after the removal of the base mould (or the blow mould), in order to sterilize the stretch rod and/or the blow moulding nozzle during this period of time.

The invention further relates to a method of shaping plastics material pre-forms into plastics material containers, with a blow moulding wheel which is driven continuously at least in a production or operation mode respectively and on which are arranged a plurality of blow moulding stations, and each blow moulding station comprises elements movable relative to the blow moulding wheel, such as for example a stretch rod for the longitudinal expansion of the pre-forms or at least one blow mould—capable of being opened—for the discharge of the expanded plastics material containers, in which the plastics material pre-forms are expanded inside the blow mould to form the plastics material containers with the aid of an expansion agent and the stretch rod, and in which at least one partial face of a moved element is cleaned and/or sterilized with sterilization and/or cleaning agent in a cleaning and/or sterilization mode and/or in the production mode.

According to the invention at least this one moved element is moved in the cleaning and/or sterilization mode to a position or into an orientation which differs from the positions and/or orientations of the normal operating mode. As a result, the object stated in the introduction is likewise attained.

The difference in the case of a rotating blow moulding wheel is that the element is positioned (orientated) at a specified position in the peripheral direction of the blow moulding wheel in a different manner from what it would be just at this peripheral position in regular operation. In a further development the element can also be moved into a position (or orientation) which is never achieved in regular operation.

With reference to an exchange of the blow moulds, during the exchange the blow mould to be inserted can be sterilized in the form of an element moved in production operation for example in a changing operation in a position and/or orientation in which it is not present in production operation.

In this way, it is possible for example to sterilize even the faces which are not sterilized in the production mode. An example of the face which may be mentioned is the clamping face on which the blow mould is held in a blow mould holder, and also the external face of the blow mould which in the production cycle normally rests against the blow mould holder, in particular over the entire area.

In the changing mode the moved element, in particular the blow mould or the base mould, is therefore first released from the holder thereof, is then removed from the latter, and is then sterilized.

In the same way, in the changing mode an element to be newly inserted can first be moved into a position remote from the holder, where it is sterilized and then inserted.

In the same way, the abutment face on the holder for the element can be sterilized before the insertion of the new element or after the removal of the old element respectively.

In particular, the change is carried out by an automatic machine such as a robot, which is provided with gripping arms for gripping the elements to be exchanged. In particular, the robot is arranged so as to be stationary and it changes the elements in succession at a plurality of blow moulding stations. To this end, the blow moulding wheel can rotate past the robot in steps and can stop briefly for changing the elements of a blow moulding station. In theory, a continuous exchange would also be possible.

To this end, the sterilization nozzle is, in particular, arranged in a region which is also arranged in the region of the robot which is capable of being reached. If an operator were to carry out the exchange, the sterilization nozzle is arranged in the access area of this operator.

If the blow moulding nozzle of the blow moulding station is used for the sterilization, then in particular only the nozzle of the blow moulding station at which the change has also just been carried out will spray sterilization agents. The robot or an operator can in this case arrange the blow moulds below this nozzle for the sterilization time.

In particular, the exchanging robot and/or the blow moulding wheel can be arranged at least locally in a clean room, but the method is also well suited for use under only hygienic conditions.

An automatic machine or a robot is also to be understood as being a removal and/or introduction star wheel for conveying the elements, and in particular blow moulds. The blow moulds are preferably stored in an assembled state in order to save as much space as possible. The assembly can be carried out before or after the removal of the blow moulds from the blow mould carrier. To this end, additional clamping means can be arranged on the blow mould which hold the two blow mould halves and, in addition, optionally the base to one another.

If the blow mould wheel is present at least in part and the blow moulds used in the production are present in a clean room, then it is preferable for the magazine in which the blow moulds not yet in use are present likewise to be present in a clean room.

In particular, the robot or at least the elements thereof contacting the blow moulds (for example clamps) respectively is also sterilized at regular intervals.

A clean room is essentially characterized in that it is held under over-pressure with sterile air in such a way that as little air as possible can penetrate from the external atmosphere into the clean room.

In addition, it is possible for at least one face of the element—the accessibility of which is restricted for cleaning and/or sterilization in the normal production mode, for example on account of the arrangement behind seals or other elements, in particular moved elements—to be sterilized and/or cleaned.

In particular, in the sterilization mode, in which the stretch rods are sterilized by way of the blow moulding air lines and the blow moulding nozzle, the blow moulding wheel is driven in a continuous manner. In this way, the sterilization agent can be conveyed to further faces of other elements by the swirling of the air. To this end, at least one blow mould, and preferably all the blow moulds, can also be opened at one time.

It is likewise possible for the blow mould also to be kept closed for a period of time during the sterilization cycle, in order to achieve a thorough rinsing of the blow mould with sterilization agent. In particular, the stretch rod can be made hollow for this purpose, and during this period a continuous flow of sterilization agent is formed from the tip of the stretch rod open at the bottom (or lateral holes) to the blow moulding nozzle through which the sterilization agent is fed again in the direction of air lines in order likewise to sterilize the latter. This is naturally also possible in the other direction (from the blow moulding nozzle to the tip of the stretch rod). To this end, the stretch rod is, in particular, also downwards.

The moved element can be for example the stretch rod, the blow mould or a half of the blow mould, a base part of the blow mould, a carrier for the blow moulds, an intermediate shell which is arranged between the carrier and the blow mould, a locking means (for example a hook or a corrugation), a blow moulding nozzle, a stretch stop, a pressure pad, a valve piston of the blow moulding valves, a control cam, a clamp on the blow moulding station for receiving pre-forms or containers respectively, or levers or shafts respectively by which the moved parts are actuated.

If the element is at least one part of a blow mould, then this part can be replaced by a part of another blow mould during a mould-changing mode carried out between two production modes following one after the other. In particular, the removed part (5) is cleaned and/or sterilized after the removal and/or the newly inserted part (5) is cleaned and/or sterilized before the insertion.

In general, the cleaning and/or sterilization mode can overlap with the mould-changing mode and/or the production mode at least for a time. In this case an element, for example the stretch rod, can be sterilized in the production mode and the blow mould can be sterilized in the mould-changing mode.

In the mould-changing mode the interior of the machine, i.e. for example the walls of the housing and the blow mould carriers and the conveying star wheels, is brought in particular to an increased temperature, so that a sterilization agent (gaseous hydrogen peroxide) introduced in the mould-changing mode condenses to only a small degree or not at all on these walls, but sterilizes the latter. In particular, the gas is introduced into the interior by way of the blow moulding nozzles. In particular, a removed blow mould and/or at least one blow mould to be newly inserted is or are heated and sterilized during this process. After the sterilization the blow mould can then be inserted into the holder. The removed blow mould either can be removed from the interior, in particular by a sluice, and stored outside the machine in a magazine, or remains inside the interior on holders or storage locations respectively provided for them.

In the case of a further advantageous method the following steps are provided:
- the production of containers from a plurality of blow moulding stations arranged on a blow moulding wheel (production mode)
- the stopping of the production
- the discharge of sterilization gas from the blow moulding nozzle which surrounds a stretch rod in an annular manner (sterilization mode)
- the moving of the stretch rod relative to the blow moulding nozzle during the discharge of sterilization gas.

The embodiments of the method already illustrated or of the apparatus respectively are likewise capable of being integrated in the arrangements of the method.

BRIEF DESCRIPTION OF THE DRAWINGS

Further advantages, aims and properties of the present invention are explained with reference to the accompanying drawings and the following description, in which a shaping apparatus for shaping plastics material pre-forms into plastics material containers and for carrying out the method according to the invention is illustrated and described by way of example. In the drawings FIG. 1 is a perspective view of a blow moulding station of a shaping apparatus in a diagrammatic manner comprising a blow moulding device for shaping plastics material pre-forms into plastics material containers;

FIG. 2 is a top view of the shaping apparatus in a diagrammatic manner with a plurality of blow moulding stations arranged on a blow moulding wheel as shown in FIG. 1 and with a sterilization device which is positioned between a run-out star wheel and a run-in star wheel and by means of which sterilization agent can be conveyed from radially outside the blow mould to a stretch rod lowered into the opened blow mould;

FIG. 3 is a partially cut-way view of the opened blow mould in a diagrammatic manner along the section line B-B in FIG. 2 with the stretch rod and the blow moulding nozzle moved down and the base part lowered;

FIG. 4 is a partially cut-way view of the opened blow mould in a diagrammatic manner in FIG. 2 in another illustration and in the direction of the sterilization device;

FIG. 5 is another top view of the shaping apparatus in a diagrammatic manner with an angular dimension distribution indicated in the direction of rotation of the blow moulding wheel;

FIG. 6 is a partially cut-way view of the blow moulding device in a diagrammatic manner with an angular dimension of 300° with the stretch rod inserted and the blow moulding nozzle moved downwards;

FIG. 7 is a partially cut-way view of the blow moulding device in a diagrammatic manner with an angular dimension of 350° with the stretch rod moved downwards and the blow moulding nozzle inserted;

FIG. 8 is a partially cut-way view of the blow moulding device in a diagrammatic manner with an angular dimension of 10° with the stretch rod inserted again in part and the blow moulding nozzle moved downwards;

FIG. 9 is another partially cut-way view of the blow moulding device in a diagrammatic manner with an angular dimension of 300° with the stretch rod and the blow moulding nozzle inserted;

FIG. 10 is another partially cut-way view of the blow moulding device in a diagrammatic manner with an angular dimension of 350° with the stretch rod and the blow moulding nozzle inserted, in which a discharge element for the discharge of the sterilization agents is arranged between the blow moulding head and the blow mould;

FIG. 11 is another partially cut-way view of the blow moulding device in a diagrammatic manner with an angular dimension of 10° with the stretch rod and the blow moulding nozzle inserted, in which a discharge element for the discharge of the sterilization agents is arranged between the blow moulding head and the blow mould; and FIG. 12 is a partially cut-way view of a valve block of an alternative blow moulding device in a diagrammatic manner, in which sterilization agents are conveyed from outside to the stretch rod by way of blow moulding air channels.

DETAILED DESCRIPTION

The blow moulding station 1 shown in FIG. 1 is one of a plurality of blow moulding stations 1 of the shaping apparatus 2 shown in a diagrammatic manner in FIG. 2 for shaping plastics material pre-forms (not shown) into plastics material containers (likewise not shown).

The blow moulding stations 1 comprise in each case a blow moulding device 3 which has a main carrier 4 on which is arranged a blow mould 5 in a blow mould carrier 6 (shown only diagrammatically in part).

A cavity 7, inside which the plastics material pre-forms are expanded to form plastics material containers by being acted upon with compressed air, is formed inside the blow mould 5.

In addition, the blow moulding device 3 has a stretch rod 8 which in this case is movable in the longitudinal direction L in order to stretch the plastics material pre-forms additionally during the expansion by the compressed air.

The blow mould 5 has a first half 9 and a second half 10 which are held in each case in corresponding halves 6A and 6B of the blow mould carrier 6. In this case the blow mould halves can be arranged on blow mould carrier shells and the latter can be arranged in turn on the blow mould carrier halves.

In addition, the blow mould 5 has a base part 11 which terminates the cavity 7 towards the bottom in the state of the blow mould 5 ready for operation. As shown in the illustration according to FIG. 1, in this state of the blow mould 5 ready for operation the base part 11 is situated in a functional position 11A of the base part in which the base part 11 also bounds the cavity 7. When the blow mould 5 is opened the base part 11 can be lowered in the longitudinal direction L and in this case can be removed from the blow mould halves 9 and 10. It is usual for the blow mould halves to be pivoted away at a right angle to L beforehand. The blow moulding stations can also be of the type in which only one half is capable of being pivoted away, while the other is fixed.

In addition, the blow moulding device 3 further comprises a pressure stressing device with a blow moulding head or blow moulding piston 12 respectively and with a blow moulding nozzle 13, which acts upon the plastics material pre-forms with compressed air, so that as a result the latter can be expanded inside the blow mould 5 to form the respective plastics material containers.

The shaping apparatus 2 shown in greater detail in FIG. 2 has a blow moulding wheel 20 which rotates in the direction of rotation 21. Altogether eight blow moulding stations 1 circulate with the blow moulding wheel 20 in such a way that the blow moulds 5 of the individual blow moulding devices 3 (see for example FIG. 1) in the region of a rotation path 22 can be opened and closed again by means of an opening and closing mechanism (not shown in this case).

In this embodiment the rotation path 22 is situated in the region of a run-out star wheel 23 for the removal of the ready blow moulded plastics material containers from the opened blow moulds 5 running past in each case, and a run-in star wheel 24 for the insertion of the plastics material pre-forms into the opened blow moulds 5 running past in each case. To this end, both the run-in star wheel 24 and the run-out star wheel 23 have suitable manipulation elements 25 (numbered only by way of example) by means of which either the plastics material pre-forms (run-in star wheel 24) or the plastics material containers (run-out star wheel 23) can be manipulated.

In the region of the rotation path 22, along which the blow moulds 5 are opened and the corresponding base parts 11 are lowered below the respective function position 11A of the base part (see FIG. 1), a sterilization device 30 with discharge elements 31 for the discharge of sterilization agent 32 is situated at a radial distance from the blow moulding wheel 20.

In this embodiment the discharge elements 31 comprise in each case a spray nozzle 33 (see in particular FIGS. 4, 7, 8 and 10 or 11 respectively) in order to spray the sterilization agent 32 from outside the stretch rod 8 and the respective blow mould 5 onto the exterior face 35 (see in particular FIG. 1) of the stretch rod 8, so that the outer side 36 of the stretch rod 8 can be sterilized in a sterilization process integrated in a blow moulding cycle in a simple manner. In this case it should be mentioned once again that the spray nozzle 33 can also spray cleaning agents. The terms cleaning and sterilization are used synonymously here and hereinafter.

To this end, in the region of the rotation path 22 the stretch rod 8 is displaced into the cavity 7 of the blow mould 5, as may be clearly seen from the illustration according to FIG.

3. In this case the stretch rod 8 is displaced with the lower end 37 thereof beyond the functional position 11A of the base part, so that regions at the upper end 38 of the stretch rod 8 are no longer covered by the pressure stressing device and, in this way, they can also be reached and sterilized by the sterilization agents 32 sprayed from the outside.

At the same time a sterilization of the exterior face 39 of the blow moulding nozzle 13 could also be carried out if the latter were displaced at least in part into the blow mould 5 in an alternative or subsequently cumulative manner.

In addition, it is possible for a sterilization of blow moulding air channels 40 of the blow moulding nozzle 13 and/or of the stretch rod 8 also to be carried out at the same time.

It may be seen in FIG. 3 how the blow moulding nozzle 13 has been brought into a position inside the blow mould 5 in which it cannot be reached in the normal blow moulding process. Normally the blow moulding nozzle is placed on the surface of the blow mould 5 or on the pre-form to be blow moulded for the purpose of sealing off in the blow moulding process. For sterilization purposes the blow moulding nozzle can be moved downwards still further than is the case in the sealing position.

As may be readily seen further from the illustration according to FIG. 4, the spray nozzle or the sterilization agent 32 respectively is merely moved out of a valve block 41 of a blow moulding head 12 of the pressure stressing device in the direction of the blow mould 5 in order to arrive in the operative region of the spray nozzle 33.

The stretch rod 8 can be moved past the spray nozzle 33 in this way, while the spray nozzle 33 sprays the sterilization agent 32. It is also possible for a plurality of spray nozzles 33 arranged one above the other along the longitudinal direction to be positioned radially beside the stretch rod 8. In an alternative or cumulative manner, the spray nozzle 33 can be displaceable along the longitudinal direction L, so that it can also move along the stretch rod 8 in order to spray the latter from above to below with sterilization agent 32. The spray nozzle could also be displaceable with a motor drive and/or rotatable by way of the same drive or an additional drive. A setting in three axes is also possible in order to also spray the stretch rod "from the rear", i.e. radially outwards from the centre of the blow moulding wheel or in the direction of the centre axis of the blow mould from the stretch rod holder respectively.

Alternatively, at least two or more spray nozzles can also be positioned (not shown) around the stretch rod. In addition, the stretch rod and the blow moulding nozzle can be moved towards each other at least once during the spraying in order to clean/sterilize different areas along the longitudinal axis of the stretch rod and/or the blow moulding nozzle with cleaning and/or sterilization agent.

Alternatively, the blow moulding nozzle and/or the stretch rod could be designed so as to be rotatable about the longitudinal axis thereof and could be rotated by way of a drive during the sterilization process (not shown). In this way, all the faces could also be cleaned with only one discharge device or nozzle respectively in the peripheral direction of the stretch rod or the blow moulding nozzle.

With respect to the illustration of FIG. 5, the angular range 45 is clearly visible, in which the rotation path 22 described above extends. The rotation path 22, which is relevant in this case and along which the blow moulds 5 are opened, extends in an angular distribution range 46 between an angular dimension of >300° and an angular dimension of <60°. The position of the zero setting 47=0° is situated centrally between the run-out star wheel 23 and the run-in star wheel 24 in this case. If only one star wheel is used for the introduction and discharge of the containers, then this is accordingly situated at 0° (not shown). In the angular distribution range 46 the stretch rod 8 and the blow moulding nozzle 13 are normally inserted upwards into the valve block 41. In the case of the present method according to the invention at least the stretch rod 8 is moved downwards out of the valve block 41, so that it can be sprayed with sterilization agent 32, as already explained.

It should be further mentioned explicitly at this point that the sterilization according to the invention can also be carried out in another peripheral region of the blow moulding wheel 20 if the shaping apparatus 2 is designed accordingly. This applies, in particular, when for example the blow mould carrier 6 or the base part 11 respectively are also driven by electric motors (not shown in this case). In addition, further guide cams could also be provided for this purpose.

On the angular distribution range 46, however, it is advantageous for the blow moulds 5 there to have to be opened in any case for the removal of the plastics material containers or the equipping of the plastics material pre-forms respectively. In the same way, the blow mould base is usually moved downwards in this region in order to remove the containers from the moulds. In particular, if the blow mould 5 and the base are moved by way of cams, this angular range 46 is advantageous since then the drives are already present in any case at this point. In this case use can thus be made of this in a highly advantageous manner for the present sterilization process. It would also be possible, however, to open the mould carrier or the base respectively by way of cams capable of being supplied in the sterilization mode outside the angular range and to let the sterilization take place there.

In the case of base parts and lateral parts of the blow mould which are actuated exclusively electrically, the peripheral region of the blow moulding wheel 20 in which the cleaning or sterilization is carried out would be immaterial. In some cases, even when viewed in the direction of rotation 21, a region would be more suitable which is situated between 60° and 300°. In this case more space would be available on account of the absent conveying star wheels 23, 24.

As shown in the illustration according to FIG. 6, the blow mould 5 is still closed in an angular position of 300°. If the blow moulding wheel 20 rotates further in the direction of rotation 21 and if the blow mould 5 reaches an angular position of 350° (FIG. 7), the blow mould 5 is already opened. The stretch rod 8 is displaced in a non-scheduled manner into the blow mould 5 between the two blow mould halves 9 and 10, so that the stretch rod 8 can be sprayed with sterilization agents 32 from the spray nozzle 33. In this case the blow moulding nozzle 13 is inserted completely into the blow moulding head 12 of the pressure stressing device, so that the blow moulding nozzle 13 no longer projects in front of the valve block 41. In this way, the stretch rod 8 can also be sterilized further towards the upper end 38 thereof during the movement outwards and inwards. If the blow mould is rotated into an angular position of 10° (FIG. 8), the stretch rod 8 will move in again and the blow moulding nozzle 13 will move out, so that the exterior face 39 of the blow moulding nozzle 13 can now be sterilized in this case.

In a cumulative manner, following the sterilization shown in FIGS. 6 to 8, it is also possible for the inside 50 of the master mould, which surrounds the actual blow mould 5, also to be immediately jointly sterilized, as shown in the illustrations according to FIGS. 9 to 11. In addition, a sterilization of the inner wall of the blow mould, against which the plastics material pre-forms are expanded, is possible.

To this end, the spray nozzle 33 is arranged so as to be displaceable on the sterilization device 30 for example, so that with respect to the angular positions 350° (FIG. 10) and 10° (FIG. 11) for example it can be arranged centrally above the blow mould 5, in such a way that sterilization agents 32 can be sprayed downwards from above in the longitudinal direction L onto the blow mould 5 (or radiation or charge carriers respectively can be directed onto the latter respectively).

FIGS. 9 to 11 show a method of sterilizing the inner walls of the master mould during an exchange of the blow moulds. In this case the outer sides of the blow moulds can also be sterilized.

In accordance with the illustration according to FIG. 9 the blow mould 5 is still closed in the angular position of 300°. The stretch rod 8 and the blow moulding nozzle 13 are moved into the valve block 41. If the blow moulding wheel 20 rotates further in the peripheral direction 21 and if the blow mould 5, in this case reaches the angular position of 350° (FIG. 10), the blow mould 5 is already opened, and the spray nozzle 33 is situated between the blow moulding head 12 and the blow mould 5. The stretch rod 8 and the blow moulding nozzle 13 remain inserted. The sterilization agents 32 can now be applied from above to the blow mould 5 and to the inner side 50 of the master mould. In this case the blow mould 5 can be rotated about a horizontal axis in accordance with the direction of rotation 51, in order that it can be treated with sterilization agents 32 both from the outside and from the inside. After that, the blow mould 5 (or a new blow mould) at the level of the angular position of 10° (FIG. 11) is displaced back to the blow mould carrier 6 and is thus ready for use for a further blow moulding process. When a new blow mould is used, both the old one and the new one can also be sterilized in this way before the insertion and after the removal from the blow moulding station respectively. In particular, for exchanging purposes a robot or an automatic machine respectively is suitable, which accordingly moves the blow moulds past sterilization nozzles in such a way that all the faces can be sterilized or cleaned respectively (not shown).

At this point it should be mentioned once again that instead of the spray nozzle 33 it is also possible for a radiation emitter to be used as a discharge element 31 for sterilization agents 32 in order to be able to radiate sterilization agents in the form of charge carriers.

In the case of the embodiment shown in FIG. 12, the treatment of the stretch rod 8 with sterilization agents 32 is carried out by the blow moulding air channels 56 provided in an alternative pressure stressing device 55 on a valve block 57 designed in an alternative manner. In this case the sterilization agents 32 are conveyed through a first blow moulding air channel 58 as far as the exterior face 35 of the stretch rod 8 when the latter moves out from the alternative valve block 57. This takes place ideally when the blow mould 5 is closed, so that the sterilization agents 32 introduced through the first blow moulding channel 58 can be immediately conveyed out of the blow mould 5 again from a further blow moulding air channel 59. In normal working operation these channels, as mentioned above, can be used for the stressing of the plastics material pre-forms with blow moulding air. In an alternative arrangement, sterilization agent is conveyed out of at least one channel, preferably out of both channels 58, 59, in order to sterilize the stretch rod 8 which has moved down and/or down or up. The sterilization agent used in particular in this case is gaseous $H2O2$ which after reaching the external surface of the stretch rod is also further distributed to the blow moulds and optionally outside the blow mould in the machine. What is important is only that the stretch rod is extended at least at one time while the sterilization agent flows out of the valve block. In addition, in the case of this process too, the blow moulding nozzle can be moved out completely at at least one time, so that the outer walls of the blow moulding nozzle are sterilized as far as possible in the same way. In the embodiment according to FIG. 12 the blow moulding nozzle is movable together with the valve block 57. In this case it is in fact the faces of the valve block which can be sterilized when moving out. In the examples according to FIGS. 1 to 11 the blow moulding nozzle is capable of being moved relative to the valve block.

In both cases the blow mould can be opened or closed during the sterilization, or can be undone and done up in an alternating manner.

The black square faces not provided with reference numbers between the stretch rod 8 and the block 57 constitute the blow moulding air seal mentioned above. In particular, during the sterilization or cleaning, at least a small part of the stretch rod 8, which is briefly above this seal when the stretch rod is moved out to the maximum degree during the stretching, is situated at such a distance from the seal, in this case below the seal, that this part is also sterilized. In the case of blow moulding stations in which stretching takes place towards the top, i.e. away from the centre of the earth, this small part is then at the top.

The blow moulding air seal is not shown in FIGS. 1 to 11, but it can be present in all the embodiments.

It is to be understood that the embodiments explained above are merely first designs of the apparatus according to the invention for shaping plastics material pre-forms into plastics material containers. In this respect the design of the invention is not restricted to these embodiments.

The Applicants reserve the right to claim all the features disclosed in the application documents as being essential to the invention, insofar as they are novel either individually or in combination as compared with the prior art.

LIST OF REFERENCES 1 blow moulding station
2 shaping apparatus
3 blow moulding device
4 main carrier
5 blow mould
6 blow mould carrier
6A first half of the blow mould carrier
6B second half of the blow mould carrier
7 cavity
8 stretch rod
9 first half of the blow mould
10 second half of the blow mould
11 base part
11A functional position of the base part
12 blow moulding head
13 blow moulding nozzle
20 blow moulding wheel
21 direction of rotation
22 rotation path
23 run-out star wheel
24 run-in star wheel
25 manipulation elements
30 sterilization device/cleaning device 31 discharge elements
32 sterilization agent/cleaning agent
33 spray nozzle
35 exterior face
36 outer side
37 lower end
38 upper end
39 exterior face
40 blow moulding air channels
41 valve block
45 angular range
46 angular sub-range
47 zero setting
50 inside of the master mould
51 direction of rotation
55 alternative pressure stressing device
56 blow moulding air channels
57 alternative valve block
58 first blow moulding air channel
59 further blow moulding air channel
L longitudinal direction

The invention claimed is:

1. A method of shaping plastics material pre-forms into plastics material containers, in which the plastics material pre-forms are expanded inside a blow mould with the aid of an expansion agent and a stretch rod to form the plastics material containers, the method comprising: sterilizing the blow mould and the stretch rod at least in part with a sterilization agent, wherein to sterilize an exterior face of the stretch rod, the stretch rod is displaced at least partially in the blow mould, and the sterilization agent is brought from a discharge element separated from the stretch rod and a blow moulding assembly, wherein the discharge element emits the sterilization agent on at least part of the exterior face of the stretch rod and an inner wall of the blow mould, while the stretch rod is positioned at least partially inside the blow mould and out of the plastic material pre-forms.

2. The method according to claims 1, wherein the blow moulding assembly includes a blow moulding nozzle that is positioned at least partially into the blow mould and irradiated by the sterilization agent.

3. The method according to claim 2, wherein the sterilization agent is brought from outside the blow mould to at least one of the exterior face of the stretch rod and to an exterior face of the blow moulding nozzle when the blow mould is opened at least in part.

4. The method according to claim 2, wherein the stretch rod and the blow moulding nozzle are irradiated with the sterilization agent during at least one of a movement out of a blow moulding head or valve block respectively, and during a movement into the blow moulding head.

5. The method according to claim 1, wherein the stretch rod is displaced at least in part beyond a functional position of a base part of the blow mould ready for operation.

6. The method according to claim 2, wherein the stretch rod and the blow moulding nozzle are displaced into the blow mould when the blow mould passes through a rotation path between a run-out region for the discharge of an expanded plastics material container and a run-in region for the introduction of a plastics material pre-form into the blow mould.

7. A method of shaping plastics material pre-forms into plastics material containers, with a blow moulding wheel which is driven continuously at least in an operation mode respectively and on which are arranged a plurality of blow moulding stations, the method comprising:

moving, in each of the blow moulding stations, at least one stretch rod relative to the blow moulding wheel, for longitudinal expansion of the pre-forms or at least one blow mould configured to be opened for discharge of the plastics material containers;

expanding the plastics material pre-forms inside the at least one blow mould to form the plastics material containers with the aid of an expansion agent and the at least one stretch rod; and sterilizing at least one moved element and an inner wall of the at least one blow mould with a sterilization agent emitted by a discharge element separated from at least one of the blow moulding stations in at least one of a sterilization mode and the operation mode when the at least one moved element is positioned at least partially inside the at least one blow mould and out of the plastics material pre-forms, wherein the at least one moved element is moved in the sterilization mode to a position or into an orientation which differs from positions or orientations of the at least one moved element respectively of the operation mode.

8. The method according to claim 7, wherein at least one face of the at least one moved element is sterilized in the position or the orientation.

9. The method according to claim 7, wherein the at least one moved element is at least one part of the at least one blow mould and the at least one part is replaced by another part of another blow mould during a mould-changing mode carried out between two production modes following one after the other, and wherein a removed part is sterilized after the removal, and a newly inserted part is sterilized before insertion.

10. The method according to claim 7, wherein the sterilization mode overlaps with at least one of a mould-changing mode and the operation mode at least for a time.

11. A method of shaping plastics material pre-forms into plastics material containers, in which the plastics material pre-forms are expanded inside a blow mould with the aid of an expansion agent and a stretch rod to form the plastics material containers, the method comprising:

sterilizing an inner wall of the blow mould and the stretch rod at least in part with a sterilization agent, wherein to sterilize an outer side of the stretch rod, the stretch rod is displaced at least partially inside the blow mould, and the sterilization agent is brought from a discharge element, separated from the stretch rod and a blow moulding assembly including a blow moulding nozzle, wherein the discharge element emits the sterilization agent on at least part of the outer side of the stretch rod, while the stretch rod is positioned at least partially inside the blow mould, wherein a region of the outer side of the stretch rod is sterilized when it is continuously covered by the blow moulding nozzle in a production mode by moving the blow moulding nozzle up or by moving the stretch rod down further than in the production mode.

12. A method of shaping plastics material pre-forms into plastics material containers, in which the plastics material pre-forms are expanded inside a blow mould with the aid of an expansion agent and a stretch rod to form the plastics material containers, the method comprising:

sterilizing an inner wall of the blow mould and the stretch rod at least in part with a sterilization agent, wherein to sterilize an outer side of the stretch rod, the stretch rod is displaced at least partially inside the blow mould, and the sterilization agent is brought from a discharge element separated from the stretch rod and a blow moulding assembly including a blow moulding nozzle, wherein the discharge element emits the sterilization agent on at least part of the outer side of the stretch rod, while the stretch rod is positioned at least partially inside the blow mould, wherein the sterilization agent is brought from the outside to the outer side of the stretch rod and to an outer side of a face of the blow moulding nozzle when the blow mould is opened at least in part.

* * * * *